(12) United States Patent
Yu et al.

(10) Patent No.: US 11,692,981 B2
(45) Date of Patent: Jul. 4, 2023

(54) DEVICE FOR EVALUATING DAMAGE OF FRACTURING FLUID TO RESERVOIR AND OPERATION METHOD THEREOF

(71) Applicant: YANGTZE UNIVERSITY, Jingzhou (CN)

(72) Inventors: Weichu Yu, Jingzhou (CN); Ying Zhang, Jingzhou (CN); Fei Ding, Qingdao (CN); Dongkui Zhou, Jingzhou (CN); Wenming Shu, Jingzhou (CN); Aibin Wu, Jingzhou (CN); Yongtao Song, Jingzhou (CN); Yumin Li, Jingzhou (CN); Lei Yu, Jingzhou (CN)

(73) Assignee: YANGTZE UNIVERSITY, Jingzhou (CN)

( * ) Notice: Subject to any disclaimer, the term of this patent is extended or adjusted under 35 U.S.C. 154(b) by 13 days.

(21) Appl. No.: 17/391,295

(22) Filed: Aug. 2, 2021

(65) Prior Publication Data
US 2022/0412928 A1 Dec. 29, 2022

(51) Int. Cl.
*G01N 30/60* (2006.01)
*G01N 30/02* (2006.01)

(52) U.S. Cl.
CPC ..... *G01N 30/6047* (2013.01); *G01N 30/6065* (2013.01); *G01N 2030/027* (2013.01)

(58) Field of Classification Search
CPC .......... G01N 30/6047; G01N 30/6065; G01N 2030/027
See application file for complete search history.

(56) References Cited

PUBLICATIONS

Salituro, G., and C. Dufresne. "Isolation by low-pressure column chromatography". In RJP Cannell (Ed.), Natural Products Isolation. pp. 111-140. (Year: 1998).*
Interior Dost, "Supreme folding table scissor multipurpose table Hindi" [Video], YouTube. https://www.youtube.com/watch?v=4rVYNFHPNFM. Feb. 14, 2018.*
Grainger, "Lab supports, stands and clamps", https://web.archive.org/web/20200813064117/https://www.grainger.com/category/lab-supplies/lab-equipment/lab-supports-stands-and-clamps. Aug. 13, 2020.*

* cited by examiner

*Primary Examiner* — Benjamin L Lebron
(74) *Attorney, Agent, or Firm* — WPAT, PC (57) ABSTRACT

Disclosed is a device for evaluating damage of fracturing fluid to reservoir and operation method thereof, the device includes a liquid storage tank, a suction tube, a chromatography device, a bracket, a receiving container and a height adjuster; the disclosure has the following beneficial effects: since different liquids pass through the porous medium at different time and speed and the silica gel particles will not expand when immersed in the liquid, a porous structure is formed by placing silica gel particles of different sizes to simulate the pore-throat structure of unconventional oil and gas reservoirs, hence removing the influence of fracturing fluid on the hydration and expansion damage of the reservoir matrix, by testing the time and flow rate of different fracturing fluids flowing through the silica gel pores, the degree of damage caused by fracturing fluids to unconventional oil and gas reservoirs is evaluated.

6 Claims, 4 Drawing Sheets

DEVICE FOR EVALUATING DAMAGE OF FRACTURING FLUID TO RESERVOIR AND OPERATION METHOD THEREOF

FIELD OF THE DISCLOSURE

The disclosure relates to device for evaluating damage of fracturing fluid to reservoir and operation method thereof.

BACKGROUND

Large-scale volume fracturing is currently one of the most effective exploitation methods for unconventional oil and gas resources. In order to obtain the largest stimulated reservoir volume, a large amount of fracturing fluid will be injected into the formation during the fracturing process to form artificial fractures. The fracturing fluid contains a variety of additives, which are mixed in a certain proportion. The performance of the fracturing fluid is a key factor that affects the efficiency and cost of fracturing. It also relates to whether an effective supporting fracture can be formed in the reservoir, the damage to the reservoir, and the subsequent stimulation effect. Fracturing fluid has two sides. It can form fractures in the reservoir to improve the seepage capacity. At the same time, it will break the original balance of the reservoir due to the intrusion of the fracturing fluid into the reservoir and cause a certain degree of damage. With the increase in the scale and frequency of fracturing, the damage range of the fracturing fluid to the reservoir will expand from a single near-well zone to the entire reservoir, affecting the overall exploitation effect. Although fracturing is an important development stimulation measure for tight oil exploitation, the fracturing fluid, which is the core of fracturing, can also cause various damages to the formation during the fracturing process. Therefore, the damage degree of the fracturing fluid to the reservoir is one of the important indicators that affect the performance of the fracturing fluid.

The damage of fracturing fluid to unconventional oil and gas reservoirs is divided into damage to the base layer and damage to supporting fractures according to the position of damage. At present, physical simulation experiments for evaluating the damage degree of fracturing fluid to reservoirs mainly use artificial cores, natural cores, or sand-filled pipes as models to evaluate changes in permeability before and after the damage. Although this method can fully reflect the damage of the fracturing fluid to the reservoir, it has a long experimental period, cumbersome steps, and high cost of experimental materials.

SUMMARY

In view of the above-mentioned shortcomings of the prior art, a device for evaluating damage of fracturing fluid to reservoir is provided. Because different liquids pass through the porous medium at different time and speed and the silica gel particles will not expand when immersed in the liquid, a porous structure is formed by placing silica gel particles of different sizes to simulate the pore-throat structure of unconventional oil and gas reservoirs, hence removing the influence of fracturing fluid on the hydration and expansion damage of the reservoir matrix. The device mainly evaluates the damage of the fracturing fluid to the pore-throat structure and supporting fractures of unconventional oil and gas reservoirs. By testing the time and flow rate of different fracturing fluids flowing through the silica gel pores, the degree of damage caused by fracturing fluids to unconventional oil and gas reservoirs is evaluated.

A device for evaluating damage of fracturing fluid to reservoir, comprising a liquid storage tank, a suction tube, a chromatography device, a bracket, a receiving container and a height adjuster, wherein: the bracket is composed of an installing clip, a first base and a supporting rod, the supporting rod is fixed on the side of the first base, and the supporting rod is fixed with an installing clip on the upper end; the middle of the first base is fixed with a height adjuster, and the upper end of the height adjuster is fixed with an installing board; the chromatography device is composed of a silica gel particles, a sand chip, a valve and a chromatography column, and the chromatography column is installed on the mounting clip of the bracket; the lower part of the chromatography column is fixed with a sand chip, the upper part of the sand chip is fixed with silica gel particles in the chromatography column, and the bottom of the chromatography column is fixed with the valve; the receiving container is placed on the first base, and the upper opening of the receiving container is facing the lower end of the chromatography column; the liquid storage tank is placed on the installing board, and the liquid storage tank and the chromatography column are connected through the suction tube.

An operating method for the above device for evaluating damage of fracturing fluid to reservoir, including the following steps:

Step 1: designing an experimental plan based on the geological data of the well site, wherein the experimental plan includes the following: fracturing fluid formula and performance indicators, the particle size and proportion of the silica gel particles placed, and the time and volume of the fluid passing through the silica gel chromatography column;

Step 2: performing fracturing fluid preparation and performance testing, wherein the performance indicators of the performance testing include density, viscosity, and pH;

Step 3: sieving and weighing the silica gel particles, screening out four kinds of silica gel particles with 5 grams each, with particle sizes of 100-115 mesh, 120-135 mesh, 140-165 mesh and 170-200 mesh respectively;

Step 4: taking four 20 mL beakers, adding 10 mL deionized water to each beaker, and put the four kinds of silica gel particles into the four beakers while stirring with a glass rod;

Step 5: after fully stirring for 2 minutes, putting the beaker into an ultrasonic cleaner for degassing for 5 minutes;

Step 6: pouring the mixture of the silica gel particles with the sizes of 170-200 mesh and water into the chromatography column, rinsing the beaker and the wall of the chromatography column with 10 mL deionized water, repeating for 3 times, after the silica gel particles all fall into the bottom of the chromatography column, opening the valve to let the deionized water in the chromatography column flow out;

Step 7: according to Step 6, adding silica gel particles with the sizes of 140-165 mesh, 120-135 mesh and 100-115 mesh to the chromatography column layer by layer;

Step 8: taking 2 L of the fracturing fluid prepared in the Step 2, and using an ultrasonic cleaner to degas the prepared fracturing fluid;

Step 9: pouring the degassed fracturing fluid into the prepared chromatography column to the scale line of a specified height, then pouring the remaining degassed fracturing fluid into the liquid storage tank, and adjusting the height adjuster so that the liquid level in the liquid storage tank and the liquid level in the chromatography column reach the same level line;

Step 10: filling the suction tube with fracturing fluid, and quickly inserting both ends of the suction tube below the liquid level of the liquid storage tank and chromatography column, and fixing one end of the suction tube on the side of the liquid storage tank close to the chromatography device through the first fixed base;

Step 11: opening the valve, and measuring the volume of liquid flowing through the silica gel particles by the receiving container every 5-10 minutes;

Step 12: after opening the valve, observing the chromatography column of the chromatography device, if the liquid level in the chromatography column drops significantly, adjusting the height of the liquid storage tank in time through the height adjuster to keep the liquid level in the chromatography column at the original height;

Step 13: testing the damage of different fracturing fluids to the reservoir respectively, and recording the liquid volume of different fracturing fluids passing through the porous medium of silica gel particles every 5-10 minutes;

Step 14: converting the volume of liquid passing through the silica gel column in each time period into the flow rate in the corresponding time, calculating the flow damage ratio in different time periods by the following formula, and determining the damage degree of the fracturing fluid to the reservoir through the flow damage ratio;

$$R_v = \frac{V_1 - V_n}{V_1} \times 100$$

where $R_v$ is flow damage ratio, %, $V_1$ is the flow rate in the first time period, mL/min, $V_n$ is the flow rate in the nth time period, mL/min.

Compared with the prior art, this disclosure has the following beneficial effects:

Since different liquids pass through the porous medium at different time and speed and the silica gel particles will not expand when immersed in the liquid, a porous structure is formed by placing silica gel particles of different sizes to simulate the pore-throat structure of unconventional oil and gas reservoirs, hence removing the influence of fracturing fluid on the hydration and expansion damage of the reservoir matrix. The device mainly evaluates the damage of the fracturing fluid to the pore-throat structure and supporting fractures of unconventional oil and gas reservoirs. By testing the time and flow rate of different fracturing fluids flowing through the silica gel pores, the degree of damage caused by fracturing fluids to unconventional oil and gas reservoirs is evaluated. By evaluating the degree of damage caused by the fracturing fluid to the reservoir, screening out the fracturing fluids that can protect the unconventional oil and gas reservoirs. The experiment of this disclosure is carried out under normal temperature and pressure, which avoids the experimental risk of high-pressure displacement. The use of stacked silica gel particles to simulate the porous structure of the reservoir greatly reduces the cost of experimental materials and shortens the experimental period compared to the use of cores or sand-filled tubes. This disclosure utilizes the principle that the liquid level at both ends of the connecting device is consistent, so that the liquid in the liquid storage tank is automatically added to the chromatography column. The liquid storage tank uses a cubic water tank with a larger bottom area to avoid the rapid drop of the liquid level in the chromatography column. The liquid storage tank is placed on the installation board whose height can be adjusted freely. By adjusting the height of the liquid storage tank, liquid can be automatically added to the chromatography column without causing the liquid in the chromatography column to slosh, so that the liquid in the chromatography column is always kept at a constant pressure level, which is easy to operate and can avoid experimental errors caused by direct liquid addition. This disclosure is simple and quick to operate, convenient to control, safe and reliable, and reasonable in structure, and solves the problems of long experimental period, cumbersome experimental steps, and high cost of experimental materials in the existing methods for reservoir damage evaluation.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

In order to make the objectives, features, and advantages of this disclosure more obvious and understandable, the technical solutions in the embodiments of this disclosure will be described clearly and completely in conjunction with the accompanying drawings in the embodiments of this disclosure. Obviously, the following described embodiments are only a part of the embodiments of this disclosure, rather than all the embodiments. Based on the embodiments of this disclosure, all other embodiments obtained by those of ordinary skill in the art without creative work shall fall within the protection scope of this disclosure.

The device for evaluating damage of fracturing fluid to reservoir uses silica gel particles 301 to fill the chromatography column 304 to form a porous structure to simulate reservoir fractures. Since the solid residue in the fracturing fluid will remain in the silica gel particles 301 in the chromatography column 304, the flow capacity of the chromatography column 304 is significantly reduced. The damage of the fracturing fluid to the chromatography column 304 is quantitatively evaluated by the change of the flow velocity of the fracturing fluid in the chromatography column 304, and then the damage degree of different fracturing fluids to the reservoir can be quickly analyzed.

Figure 1:
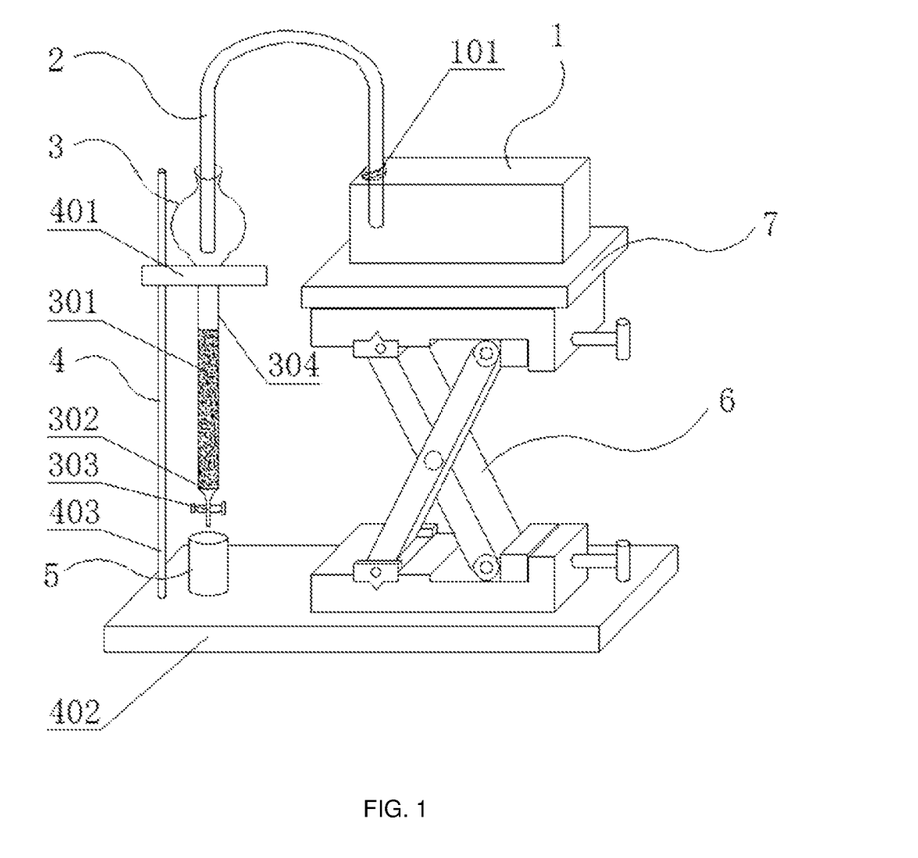
FIG. 1 is a schematic diagram of the device for evaluating damage of fracturing fluid to reservoir.
Figure 2:
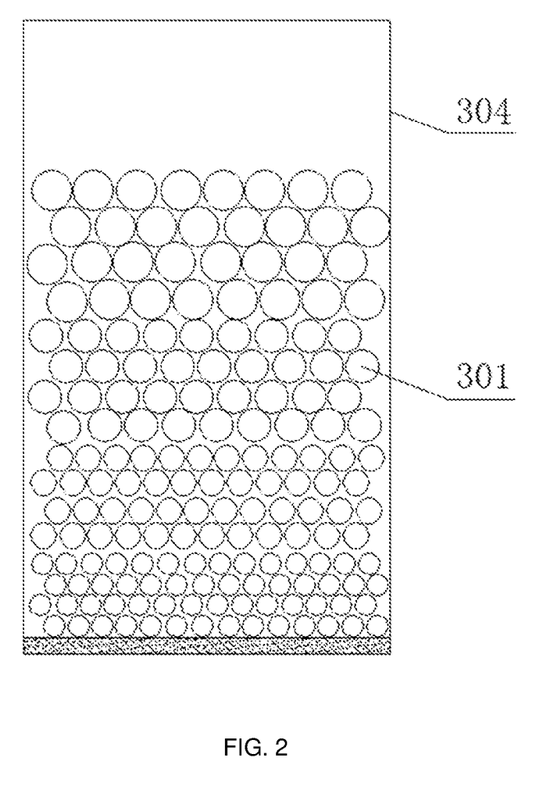
FIG. 2 is a schematic vertical cross-sectional view of the silica gel particles in FIG. 1.

The device for evaluating damage of fracturing fluid to reservoir is comprised of a liquid storage tank 1, a suction tube 2, a chromatography device 3, a bracket 4, a receiving container 5 and a height adjuster 6. The bracket 4 is comprised of an installing clip 401, a first base 402 and a supporting rod 403. The supporting rod 403 is fixed on one side of the first base 402. The upper end of supporting rod 403 is fixed with the installing clip 401. A height adjuster 6 is installed in the middle of the first base 402. The upper end of height adjuster 6 is equipped with an installing board 7. The chromatography device 3 is comprised of silica gel particles 301, a sand chip 302, a valve 303 and a chromatography column 304. The chromatography column 304 is installed on the mounting clip 401 of the bracket 4. The sand chip 302 is installed at the bottom of chromatography column 304. The silica gel particles 301 are installed in the chromatography column 304 on the upper part of the sand chip 302. The silica gel particles 301 are respectively composed of particles with a particle size of 100-115 mesh, 120-135 mesh, 140-165 mesh, and 170-200 mesh. The ratios of the four kinds of particles are all 25% by mass, so that the porous structure of the chromatography column 304 is maintained at the same level of pass rate, and the repeatability of each experiment is guaranteed. The bottom of chromatography column 304 is fixed with the valve 303. The receiving container 5 is placed on the first base 402. The upper opening of the receiving container 5 faces the bottom of the chromatography column 304. The chromatography column 304 and the receiving container 5 are respectively provided with scale lines. The scale line on the receiving container 5 can be used to read the volume of liquid passing through silica gel particles 301 within a set time in real time. The bottom area of the liquid storage tank 1 is 5-10 times the area of the circle at the largest diameter of the chromatography column 304. The liquid storage tank 1 is placed on the installing board 7. The liquid storage tank 1 and the chromatography column 304 are connected through the suction tube 2. The liquid storage tank 1 has a rectangular parallelepiped shape. One end of the suction tube 2 is fixed on the side of the liquid storage tank 1 close to the chromatography device 3 through the first fixed base 101 (see FIG. 1 and FIG. 2). The suction tube 2 maintains the same height between the liquid storage tank 1 and the chromatography device 3 through the connected pipes principle. The liquid storage tank 1 is a cubic container with a larger bottom area. The liquid in the container is connected to the chromatography column 304 through the suction tube 2 so that the liquid level in the chromatography column 304 will not change significantly. The purpose is to avoid the need to frequently add liquid in the chromatography column 304 to maintain the height of the liquid level during the experiment.

The height adjuster 6 is comprised of a platform 601, a second base 602, two rotation supporting rods 603 that cross into a scissors shape, and an adjusting handle 606. The lower ends of two rotation supporting rods 603 that cross into a scissor shape are placed on the second base 602. The upper end of the rotation supporting rod 603 is fixed with the platform 601. One end of the two rotation supporting rods 603 is fixed to one side of the second base 602 and the platform 601 through the second fixed base 604, respectively. The other ends of the two rotation supporting rods 603 are mounted in the grooves on the other side of the second base 602 and the platform 601 through a wheel 608, and the second base 602 and the platform 601 on this side are respectively fixed with an adjusting handle 606 through a spiral structure. One end of the adjusting handle 606 is in contact with the wheel 608 through the adjusting block 607. The middle of the two rotation supporting rods 603 can rotate around the shaft 605. The two ends of the two rotation supporting rods 603 can respectively rotate around the second fixed base 604 and the wheel 608 (see FIG. 3). The height adjuster 6 can adjust the height of the liquid level in the liquid storage tank 1 to supplement the liquid level in the chromatography device 3 to ensure that the liquid above the silica gel particles 301 always maintains a constant pressure state. At the same time, the experimental error caused by directly adding liquid to liquid storage tank1 or chromatography column304 is avoided.

Figure 3:
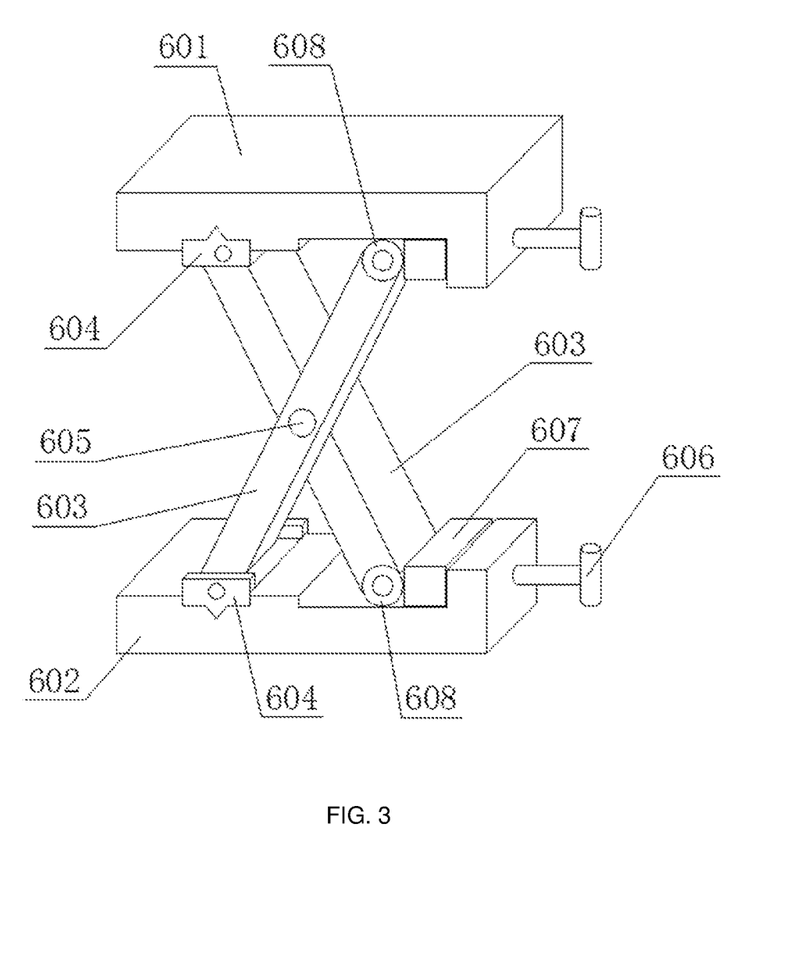
FIG. 3 is a schematic diagram of the height adjuster.

An operating method for the above device for evaluating damage of fracturing fluid to reservoir, including the following steps:

Step 1: designing an experimental plan based on the geological data of the well site, wherein the experimental plan includes the following: fracturing fluid formula and performance indicators, the particle size and proportion of the silica gel particles placed, and the time and volume of the fluid passing through the silica gel chromatography column;

Step 2: performing fracturing fluid preparation and performance testing, wherein the performance indicators of the performance testing include density, viscosity, and pH;

Step 3: sieving and weighing the silica gel particles 301, screening out four kinds of silica gel particles 301 with 5 grams each, with particle sizes of 100-115 mesh, 120-135 mesh, 140-165 mesh and 170-200 mesh respectively;

Step 4: taking four 20 mL beakers, adding 10 mL deionized water to each beaker, and put the four kinds of silica gel particles 301 into the four beakers while stirring with a glass rod;

Step 5: after fully stirring for 2 minutes, putting the beaker into an ultrasonic cleaner for degassing for 5 minutes;

Step 6: pouring the mixture of the silica gel particles 301 with the sizes of 170-200 mesh and water into the chromatography column 304, rinsing the beaker and the wall of the chromatography column 304 with 10 mL deionized water, repeating for 3 times, after the silica gel particles 301 all fall into the bottom of the chromatography column 304, opening the valve 303 to let the deionized water in the chromatography column 304 flow out;

Step 7: according to Step 6, adding silica gel particles with the sizes of 140-165 mesh, 120-135 mesh and 100-115 mesh to the chromatography column 304 layer by layer;

Step 8: taking 2 L of the fracturing fluid prepared in the Step 2, and using an ultrasonic cleaner to degas the prepared fracturing fluid;

Step 9: pouring the degassed fracturing fluid into the prepared chromatography column 304 to the scale line of a specified height, then pouring the remaining degassed fracturing fluid into the liquid storage tank 1, and adjusting the height adjuster 6 so that the liquid level in the liquid storage tank and the liquid level in the chromatography column 304 reach the same level line;

Step 10: filling the suction tube 2 with fracturing fluid, and quickly inserting both ends of the suction tube 2 below the liquid level of the liquid storage tank 1 and chromatography column 304, and fixing one end of the suction tube 2 on the side of the liquid storage tank 1 close to the chromatography device 3 through the first fixed base 101;

Step 11: opening the valve 303, and measuring the volume of liquid flowing through the silica gel particles by the receiving container 5 every 5-10 minutes;

Step 12: after opening the valve 303, observing the chromatography column 304 of the chromatography device 3, if the liquid level in the chromatography column 304 drops significantly, adjusting the height of the liquid storage tank 1 in time through the height adjuster 6 to keep the liquid level in the chromatography column 304 at the original height; when adjusting the height of the liquid storage tank 1, rotating the adjusting handle 606 of the height adjuster 6 to move the adjusting block 607 in the grooves of the second base 602 and the platform 601, and then make the wheel 608 roll in the corresponding grooves. The height adjustment of the installing board 7 is realized by adjusting the angle between the two rotation supporting rods 603, the height adjustment of liquid storage tank1 is realized by the installing board 7;

Step 13: testing the damage of different fracturing fluids to the reservoir respectively, and recording the liquid volume of different fracturing fluids passing through the porous medium of silica gel particles 301 every 5-10 minutes;

Step 14: converting the volume of liquid passing through the silica gel column in each time period into the flow rate in the corresponding time, calculating the flow damage ratio in different time periods by the following formula, and determining the damage degree of the fracturing fluid to the reservoir through the flow damage ratio;

$$R_v = \frac{V_1 - V_n}{V_1} \times 100$$

where $R_v$ is flow damage ratio, %, $V_1$ is the flow rate in the first time period, mL/min, $V_n$ is the flow rate in the nth time period, mL/min.

Here is a specific example of fracturing fluid reservoir damage evaluation.

(1) Preparation of Silica Porous Media

Weighing 5 g silica gel particles 301 of 100 mesh, 120 mesh, 150 mesh and 190 mesh respectively. Taking four 20 mL beakers and adding 10 mL deionized water to each of them. Putting the four silica gel particles 301 into four beakers while stirring the glass rod. After fully stirring for 2 minutes, putting the beaker in an ultrasonic cleaner for degassing for 5 minutes. Pouring the mixture of 190 mesh silica gel particles 301 and water into the chromatography column 304. Rinsing the beaker and the wall of the chromatography column 304 with 10 mL deionized water, repeating for 3 times, until the silica gel particles 301 all fall into the bottom of the chromatography column 304. Opening the valve 303 to let the deionized water in the chromatography column 304 flow out. Repeating the previous step, then adding the silica gel particles of 150 mesh, 120 mesh and 100 mesh to the chromatography column 304 layer by layer.

(2) Fracturing Fluid Preparation

Measuring 3 parts of deionized water, 2 L each, and preparing No. 1 fracturing fluid, No. 2 fracturing fluid, and No. 3 fracturing fluid with drag reducers and additives. The formula of No. 1 fracturing fluid is deionized water+0.1% water-based drag reducer+0.2% multifunctional additive. The formula of No. 2 fracturing fluid is deionized water+0.1% oil-based drag reducer+0.2% multifunctional additive. The formula of No. 3 fracturing fluid is deionized water+0.1% powder drag reducer+0.2% multifunctional additive. After the preparation is completed, an ultrasonic cleaner is used to degas the prepared No. 1 fracturing fluid, No. 2 fracturing fluid, and No. 3 fracturing fluid.

(3) Reservoir Damage Test

Slowly pouring the degassed fracturing fluid into the prepared chromatography column 304 to the scale line of a specified height. Then pouring the remaining degassed fracturing fluid into the liquid storage tank 1 so that the liquid level in the liquid storage tank 1 and the liquid level in the chromatography column 304 reach the same level;

Filling the suction tube 2 with fracturing fluid, and inserting both ends of the suction tube 2 below the liquid level of the liquid storage tank 1 and chromatography column 304, and fixing the suction tube 2 through the first fixed base 101;

Opening the valve 303, and measuring the volume of liquid flowing through the silica gel particles by the receiving container 5 every 5 minutes;

If the liquid level in the chromatography column 304 drops significantly, adjusting the height of the liquid storage tank 1 in time to keep the liquid level in the chromatography column 304 at the original height.

(4) Data Processing

The flow damage ratio data of different samples tested are shown in Table 1 and FIG. 4 below.

TABLE 1

The flow damage ratio data of No. 1 fracturing fluid, No. 2 fracturing fluid, and No. 3 fracturing fluid

| Time/ min | Volume of liquid passing through the silica gel column/mL | | |
|---|---|---|---|
| | No. 1 fracturing fluid | No. 2 fracturing fluid | No. 3 fracturing fluid |
| 5 | 36 | 22.4 | 11 |
| 10 | 25.5 | 7.2 | 0.5 |
| 15 | 24 | 6.8 | 0 |
| 20 | 21.5 | 5.4 | 0 |
| 25 | 21.5 | 5.2 | 0 |
| 30 | 20.5 | 4.4 | 0.5 |
| 35 | 19.5 | 4 | 0 |
| 40 | 18.5 | 3.8 | 0 |
| 45 | 18 | 3.4 | 0 |
| 50 | 18 | 3.2 | 0.2 |
| 55 | 17.5 | 3.2 | 0 |
| 60 | 17.5 | 3 | 0.1 |

According to China's oil and gas industry standard SY/T5358-2010 "Reservoir Sensitivity Flow Experimental Evaluation Method", the impact of fracturing fluid on core matrix permeability was tested. The initial test fluid is used to determine the initial permeability of the rock sample. After measuring the initial permeability of the rock sample, it is replaced with a different fracturing fluid, but the displacement rate should remain the same as the initial test fluid. After displacing 10-15 times of the pore volume, stopping the displacement, and keeping the confining pressure and temperature unchanged, making the intermediate fracturing fluid fully react with the rock and minerals for 2 h, and then measuring the permeability after damage. The damage rate data to the core permeability is shown in Table 2.

TABLE 2

Damage rate data to the core permeability of No. 1 fracturing fluid, No. 2 fracturing fluid, and No. 3 fracturing fluid

| Type of the fracturing fluid | Initial permeability/ $10^{-3}$ um$^2$ | Permeability after damage/$10^{-3}$ um$^2$ | Permeability damage rate/% |
|---|---|---|---|
| No. 1 fracturing fluid | $2.87 \times 10^{-3}$ | $2.361 \times 10^{-3}$ | 17.80 |
| No. 2 fracturing fluid | $2.16 \times 10^{-3}$ | $5.00 \times 10^{-4}$ | 76.84 |
| No. 3 fracturing fluid | $6.3 \times 10^{-3}$ | $6.70 \times 10^{-4}$ | 89.36 |

Figure 4:
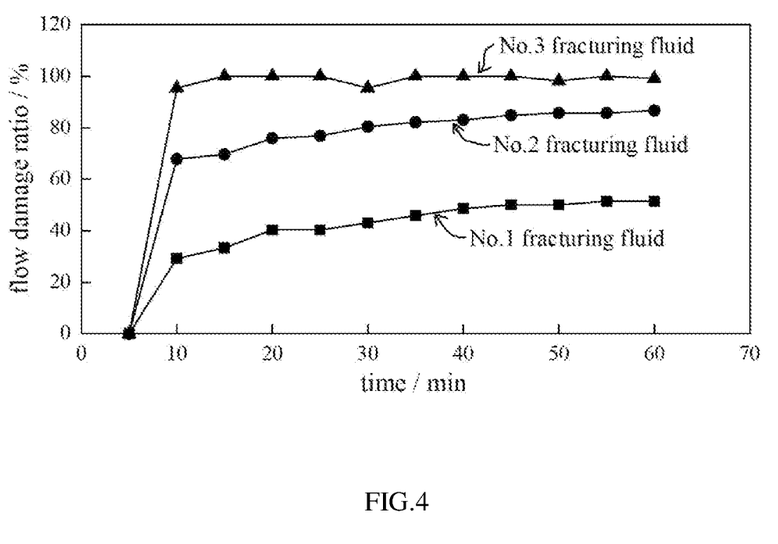
FIG. 4 is a schematic diagram of the comparison of the flow damage ratio of the three fracturing fluids.

It can be seen from FIG. 4 that the flow damage ratios of No. 1 fracturing fluid, No. 2 fracturing fluid, and No. 3 fracturing fluid are 50%, 80%, and 100% respectively. Comparing the core damage data with the flow damage ratio data shows that there is a positive correlation between the two, that is, the higher the core damage rate, the greater the flow damage ratio.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A device for evaluating damage of fracturing fluid to reservoir, comprising a liquid storage tank, a suction tube, a chromatography device, a bracket, a receiving container, and a height adjuster, wherein:
the bracket is composed of an installing clip, a first base and a supporting rod, the supporting rod is fixed on the side of the first base, and the supporting rod is fixed with the installing clip on the upper end;
the middle of the first base is fixed with a height adjuster, and the upper end of the height adjuster is fixed with an installing board;
the chromatography device is composed of silica gel particles, a sand chip, a valve and a chromatography column, and the chromatography column is installed on the installing clip of the bracket;
the lower part of the chromatography column is fixed with the sand chip, the upper part of the sand chip is fixed with silica gel particles in the chromatography column, and the bottom of the chromatography column is fixed with the valve;
the receiving container is placed on the first base, and the upper opening of the receiving container is facing the lower end of the chromatography column;
the liquid storage tank is placed on the installing board, and the liquid storage tank and the chromatography column are connected through the suction tube;
wherein the height adjuster is comprised of a platform, a second base, two rotation supporting rods that cross into a scissors shape, and an adjusting handle, the lower ends of two rotation supporting rods that cross into a scissor shape are placed on the second base, the upper end of the rotation supporting rod is fixed with the platform, one end of the two rotation supporting rods is fixed to one side of the second base and the platform through the second fixed base, respectively; the other ends of the two rotation supporting rods are mounted in the grooves on the other side of the second base and the platform through a wheel, and the second base and the platform on the other side of the second base are respectively fixed with an adjusting handle through a spiral structure, one end of the adjusting handle is in contact with the wheel through the adjusting block, the middle of the two rotation supporting rods can rotate around the shaft, the two ends of the two rotation supporting rods can respectively rotate around the second fixed base and the wheel.

2. The device according to claim 1, wherein the chromatography column and the receiving container are respectively provided with scale lines.

3. The device according to claim 1, wherein the bottom area of the liquid storage tank is 5-10 times the area of the circle at the largest diameter of the chromatography column.

4. The device according to claim 1, wherein the silica gel particles are respectively composed of particles with a particle size of 100-115 mesh, 120-135 mesh, 140-165 mesh, and 170-200 mesh, and the ratios of the four kinds of particles are all 25% by mass.

5. The device according to claim 1, wherein the liquid storage tank is a cubic container, and one end of the suction tube is fixed on the side of the liquid storage tank close to the chromatography device by a first fixed base.

6. An operating method for the device as claimed in claim 1, wherein the operating method including the following steps:
Step 1: designing an experimental plan based on the geological data of the well site, wherein the experimental plan includes the following: fracturing fluid formula and performance indicators, the particle size and proportion of the silica gel particles placed, and the time and volume of the fluid passing through the silica gel chromatography column;
Step 2: performing fracturing fluid preparation and performance testing, wherein the performance indicators of the performance testing include density, viscosity, and pH;
Step 3: sieving and weighing the silica gel particles, screening out four kinds of silica gel particles with 5 grams each, with particle sizes of 100-115 mesh, 120-135 mesh, 140-165 mesh and 170-200 mesh respectively;
Step 4: taking four 20 mL beakers, adding 10 mL deionized water to each beaker, and putting the four kinds of silica gel particles into the four beakers while stirring with a glass rod;
Step 5: after fully stirring for 2 minutes, putting the beaker into an ultrasonic cleaner for degassing for 5 minutes;
Step 6: pouring the mixture of the silica gel particles with the sizes of 170-200 mesh and water into the chromatography column, rinsing the beaker and the wall of the chromatography column with 10 mL deionized water, repeating for 3 times, after the silica gel particles all fall into the bottom of the chromatography column, opening the valve to let the deionized water in the chromatography column flow out;
Step 7: according to Step 6, adding silica gel particles with the sizes of 140-165 mesh, 120-135 mesh and 100-115 mesh to the chromatography column layer by layer;
Step 8: taking 2 L of the fracturing fluid prepared in the Step 2, and using an ultrasonic cleaner to degas the prepared fracturing fluid;
Step 9: pouring the degassed fracturing fluid into the prepared chromatography column to the scale line of a specified height, then pouring the remaining degassed fracturing fluid into the liquid storage tank, and adjusting the height adjuster so that the liquid level in the liquid storage tank and the liquid level in the chromatography column reach the same level line;
Step 10: filling the suction tube with fracturing fluid, and quickly inserting both ends of the suction tube below the liquid level of the liquid storage tank and chromatography column, and fixing one end of the suction tube on the side of the liquid storage tank close to the chromatography device through the first fixed base;
Step 11: opening the valve, and measuring the volume of liquid flowing through the silica gel particles by the receiving container every 5-10 minutes;
Step 12: after opening the valve, observing the chromatography column of the chromatography device, if the liquid level in the chromatography column drops significantly, adjusting the height of the liquid storage tank in time through the height adjuster to keep the liquid level in the chromatography column at the original height;
Step 13: testing the damage of different fracturing fluids to the reservoir respectively, and recording the liquid volume of different fracturing fluids passing through the porous medium of silica gel particles every 5-10 minutes;

Step 14: converting the volume of liquid passing through the silica gel column in each time period into the flow rate in the corresponding time, calculating the flow damage ratio in different time periods by the following formula, and determining the damage degree of the fracturing fluid to the reservoir through the flow damage ratio;

$$R_v = \frac{V_1 - V_n}{V_1} \times 100$$

where $R_v$ is flow damage ratio, %, $V_1$ is the flow rate in the first time period, mL/min, $V_n$ is the flow rate in the nth time period, mL/min.

* * * * *